United States Patent [19]
Catanescu et al.

[11] Patent Number: 5,883,779
[45] Date of Patent: Mar. 16, 1999

[54] PRESSURE SENSOR

[75] Inventors: Ralf Catanescu, Bremen; Thomas Scheiter, Munich, both of Germany

[73] Assignee: Siemens Aktiengesellschaft, Munich, Germany

[21] Appl. No.: 836,964

[22] PCT Filed: Nov. 15, 1995

[86] PCT No.: PCT/DE95/01587

§ 371 Date: May 22, 1997

§ 102(e) Date: May 22, 1997

[87] PCT Pub. No.: WO96/16319

PCT Pub. Date: May 30, 1996

[30] Foreign Application Priority Data

Nov. 24, 1994 [DE] Germany .......................... 44 41 903.1

[51] Int. Cl.⁶ .......................................... H01G 7/00
[52] U.S. Cl. ................... 361/283.1; 361/283.4; 73/718; 73/724
[58] Field of Search .............. 361/283.1, 283.4, 361/278, 280; 73/718, 724, 726, 727; 257/418

[56] References Cited

U.S. PATENT DOCUMENTS

| | | |
|---|---|---|
| 4,332,000 | 5/1982 | Petersen . |
| 4,665,610 | 5/1987 | Barth . |
| 4,831,492 | 5/1989 | Kuisma . |
| 5,095,401 | 3/1992 | Zavracky et al. . |

FOREIGN PATENT DOCUMENTS

| | | |
|---|---|---|
| 1 229 323 | 11/1966 | Germany . |
| 34 45 774 A1 | 7/1985 | Germany . |
| 36 23 561 A1 | 1/1988 | Germany . |
| 44 10 631 A1 | 10/1994 | Germany . |

OTHER PUBLICATIONS

Industriellen–Messtechnik, IBM Composer pp. 11–12 Dec. 1983—Professor Dr. P. Profos.

Application of Electrostatic Feedback To Critical Damping of an Integrated Silicon Capacitive Accelerometer—Sensors and Actuators A, 43 (1994) 100–106—R.P. van Kampen et al.

*Primary Examiner*—Kristine Kincaid
*Assistant Examiner*—Anthony Dinkins
*Attorney, Agent, or Firm*—Hill & Simpson

[57] ABSTRACT

Micromechanically producible capacitively operating pressure sensor, in which there is a diaphragm, formed by a diaphragm layer (5), on a silicon substrate (1) over a hollow (4) in an auxiliary layer (3), and in which there is, on the side of the diaphragm averted from the hollow (4) and at a distance therefrom, an electrode formed by an electrode layer (8) with recesses (9) therein as a counter-electrode to the electrically conductive diaphragm layer (5). Given a rise in the external pressure, it is possible by applying a voltage between the diaphragm layer (5) and the electrode layer (8) to prevent the diaphragm from deflecting in the direction of the substrate, and to determine the magnitude of the pressure from the voltage required therefor.

5 Claims, 1 Drawing Sheet

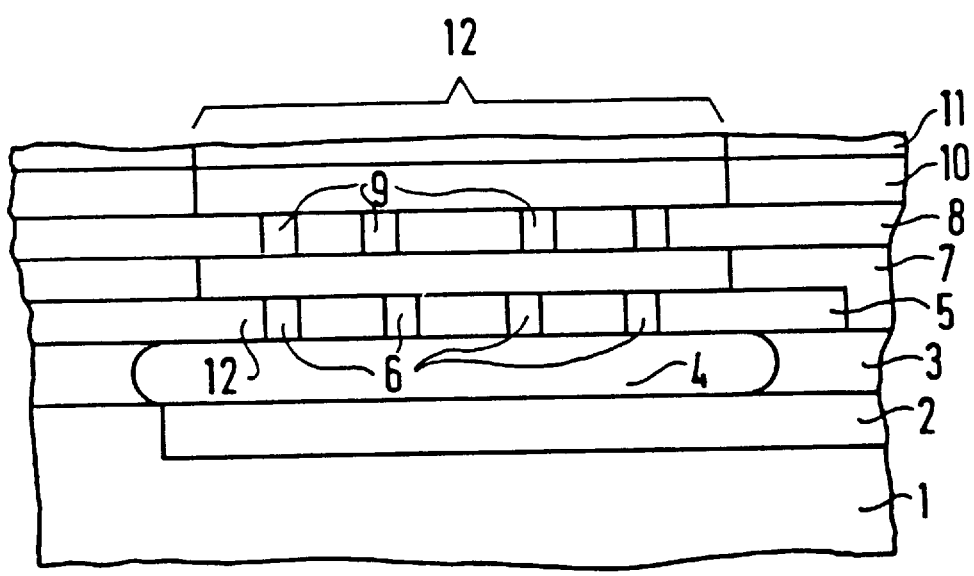

PRESSURE SENSOR

BACKGROUND OF THE INVENTION

The present invention relates to a micromechanically producible capacitive pressure sensor.

A closed chamber at a reference pressure is sealed by an elastic diaphragm which is exposed to an external pressure. The electrically conductive diaphragm forms a plate capacitor with the opposite side of this chamber. The diaphragm is deformed because of the pressure difference between the external pressure and the internal reference pressure. The capacitance of this capacitor changes owing to the change in the distance between the diaphragm and the rear side of the chamber, which acts as a counter-electrode. The external pressure can be determined from this change in capacitance.

U.S. Pat. No. 5,095,401 by Paul M. Zavracky et al., describes pressure sensors on an SOI substrate, in which a hollow is produced by removing a region, made from silicon oxide and produced by means of LOCOS, through small openings in a layer applied thereupon. These openings are subsequently sealed by oxidizing the adjoining silicon or by applying a further layer made from silicon nitride, polysilicon or the like. This patent specification also describes the use of the method of production specified there for producing pressure sensors which measure in a capacitive fashion. A constituent of the diaphragm of this pressure sensor is a crystallized silicon layer which is used outside the pressure sensor to integrate electronic components, and is used in the region of the diaphragm to form piezoelectric resistors.

SUMMARY OF THE INVENTION

It is the object of the present invention to specify a micromechanically producible capacitive pressure sensor in which the problem of a nonlinear dependence of the capacitance on the acting pressure is eliminated and to specify an associated production method which can be carried out in a BiCMOS process.

In general terms, the present invention is a pressure sensor as a semiconductor component having a hollow which is bounded on one side by a diaphragm formed essentially by an electrically conductive diaphragm layer. On the side of the hollow averted from the diaphragm there is a region which is doped in an electrically conductive fashion. There is an electrically conductive electrode layer on the side, averted from this hollow, of this diaphragm at a distance from this diaphragm, in which this electrode layer is pierced by holes. These openings are of such a nature, and this diaphragm can e deformed such that in the event that within a prescribed interval there is a change in a pressure prevailing in a medium on the side, averted from this hollow, of this electrode layer, it is possible to measure that change in a voltage, applied via electrical terminals to this diaphragm layer and this electrode layer or this doped region, which is required to counteract a deformation of this diaphragm in an electrostatic fashion. There are contacts for these electrical terminals of this diaphragm layer, of this electrode layer and of the doped region.

Advantageous developments of the present invention are as follows.

There are recesses in the diaphragm layer in the region of this diaphragm which in each case pierce both surfaces of this diaphragm layer. Material of a sealing layer applied to the diaphragm layer is introduced into these recesses. This sealing layer does not cover the side of the diaphragm averted from the hollow.

The diaphragm layer is polysilicon.

The diaphragm layer is metal.

The electrode layer is formed by one or more metal layers.

The present invention is also a method for producing a pressure sensor that has the following steps:

a) a layer provided for producing the hollow is produced above a doped region and the diaphragm layer is applied thereto;

b) a mask is used to produce in this diaphragm layer, in the region of the diaphragm to e produced, recesses of a size dimensioned for the following steps c) and d);

c) a hollow is etched out in the layer provided therefor by using these recesses;

d) a sealing layer is applied to the diaphragm layer such that the recesses are sealed without the hollow being filled up;

e) the electrode layer is applied and provided with the openings;

f) using these openings, material present between the diaphragm layer and the electrode layer is etched away in the region of the diaphragm to be produced, and the means required to apply a voltage to the diaphragm layer and the electrode layer are produced.

In a development of the present invention, a diaphragm layer is produced from polysilicon in step a), and dopant is implanted in a following step in order to render the diaphragm layer electrically conductive.

In a further development of the present invention, a spacer layer is applied between steps d) and e), and this spacer layer is etched away in step f) in the region of the diaphragm to be produced.

The pressure sensor according to the invention achieves the object set by using electrostatic compensation to prevent movement of the diaphragm in the event of a change in the acting external pressure. The pressure is determined from the magnitude of a voltage required for this electrostatic compensation. Because the diaphragm is not deflected, there is no nonlinearity. Consequently, there is also no need to structure the diaphragm in a special way or to limit the maximum possible deflection of the diaphragm. The electronic evaluation of the measuring signals is likewise simplified. During production, the design according to the invention, which employs surface micromechanics, makes use only of process steps which are a standard feature of a BiCMOS process. Additionally required process steps in which masks are used can be performed in such a way that they are as far as possible compatible with the remainder of the process. It is therefore possible to realize sensor components and circuit components simultaneously in a simple way on one chip.

The mode of operation of the pressure sensor is based on electrostatic force compensation (Force Balancing Sensor, FBS). In this case, it is not the deflection of the diaphragm which serves as a measure of the pressure, but the force which is required to keep the diaphragm in the rest position, and which is determined indirectly from the voltage which this force causes in an electrostatic fashion. For the pressure sensor to be able to be used at a higher pressure than the reference pressure, it is necessary that an electrostatic compensation force can act on the diaphragm in a direction opposite to the acting external pressure. For this purpose, the diaphragm is designed to be electrically conductive, and there is a pierced counter-electrode on the outside of the pressure sensor above the diaphragm.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

The single FIGURE depicts the pressure sensor of the present invention.

DESCRIPTION OF THE PREFERRED EMBODIMENTS

A diaphragm layer 5, a sealing layer 7, an electrode layer 8 and further layers 10, 11 are represented in the FIGURE on a substrate 1 having a conductive region 2, which is constructed on one surface and is provided as a bottom counter-electrode, and having an auxiliary layer 3, which can be, for example, an upper component layer of the substrate 1 which is oxidized in parts by means of LOCOS. Located in the auxiliary layer 3 is a hollow 4 which is evacuated or is filled with air or another gas or gas mixture which is at the reference pressure. Recesses 6 which are filled with material of the sealing layer 7 removed in the region of the diaphragm 12 are located in the diaphragm layer 5. An interspace which permits the diaphragm to be deflected in both directions perpendicular to the diaphragm plane is located between the diaphragm 12 and the electrode layer 8. Recesses 9 which are not sealed are located in the electrode layer 8 in order that an external pressure can act on the diaphragm 12 formed by the component of the diaphragm layer 5 located above the hollow 4. The further layers 10, 11 present above the electrode layer 8 are removed in the region of the diaphragm 12.

The recesses 9 in the electrode layer 8 each pierce both boundary surfaces of the electrode layer 8 and are dimensioned and arranged such that, in the event of a change in the external pressure, due to flow through these recesses 9, this change in pressure is communicated even to the diaphragm 12 in a time which is sufficiently short for the intended use of the pressure sensor. The doped region 2 can be omitted in the case of special embodiments provided for measuring an increased pressure. The electrical terminals at the conductive layers 5, 8 are located to the side and are not illustrated in the FIGURE. Contacts on the conductive region 2, the diaphragm layer 5 and the electrode layer 8 are applied in the manner known per se.

A substrate 1 made from silicon is used, for example, in producing this pressure sensor. The conductive region 2 can be formed on a top side by diffusing in dopant. The auxiliary layer 3 is preferably produced by local oxidation of the silicon by means of LOCOS. However, instead of this it is possible to apply a separate layer as auxiliary layer 3. For example, polysilicon which is applied together with the gate electrodes for simultaneously produced MOSFETs and is subsequently doped in an electrically conductive fashion can be used for the diaphragm layer 5. Instead of this, a metal layer or sequence of layers of various metals can be used for the diaphragm layer 5, such as are applied, for example, as metallic coating for the wiring of electronic circuits produced on the same chip.

The recesses 6 in the diaphragm layer 5 are produced by means of a perforated mask, and the hollow 4 is produced through these recesses 6 by etching out the auxiliary layer 3 or removing the oxide previously produced by means of LOCOS. Thereafter, the sealing layer 7 is applied, and this can be, for example, a planarizing layer made from dielectric. The recesses 6 can be dimensioned such that they are sealed with the material of the sealing layer 7 without the hollow 4 being filled up in the process. The electrode layer 8 is then applied over the entire surface of the sealing layer 7. The electrode layer 8 can expediently be formed, for example, by one or more metal layers of the levels of metallization provided for the electrical wiring.

The recesses 9 are produced in the electrode layer 8 by means of a further mask, and the material of the sealing layer 7 is removed from the surface of the diaphragm through these recesses 9 in the region of the diaphragm 12 to be produced. In this process, the time of the etching process is limited such that the recesses 6 in the diaphragm layer 5 remain sealed by remaining material of the sealing layer 7. The further layers 10, 11 are, for example, passivation layers or insulation layers which are applied in the course of the overall process. These further layers 10, 11 are removed from the top side of the electrode layer 8 in the region of the diaphragm 12, the recesses 9 being opened in the electrode layer 8. If the sealing layer 7 cannot be applied at a thickness required for the capacitance which is adequate for the envisaged measuring range, a further layer can be provided as spacer layer between the sealing layer 7 and the electrode layer 8.

In the case of this pressure sensor, the measurement result does not contain a nonlinearity in the capacitance as a function of the diaphragm deflection when a voltage for producing an electrostatic restoring force is applied to the counter-electrode formed by the electrode layer 8 or, if appropriate, to the doped region 2 formed in the substrate 1. The square of this applied voltage is proportional to the acting pressure (more accurately: pressure difference between the pressure in the hollow 4 and the external pressure). This produces an exactly defined dependence of the measuring signal on the pressure difference to be measured. The nonlinearities occurring in the case of conventional capacitive pressure sensors therefore do not occur and do not have to be eliminated in an expensive way, for example by subsequent evaluation in the electronic circuit.

The invention is not limited to the particular details of the method and apparatus depicted and other modifications and applications are contemplated. Certain other changes may be made in the above described apparatus without departing from the true spirit and scope of the invention herein involved. It is intended, therefore, that the subject matter in the above depiction shall be inter-pretend as illustrative and not in a limiting sense.

What is claimed is:

1. A pressure sensor comprising:

a semiconductor having a doped region, a hollow area in a further region over the doped region, a diaphragm layer having first and second sides with the first side adjacent the hollow area, and an electrically conductive electrode layer over the second side of the diaphragm;

the electrode layer being pierced by holes;

the diaphragm being deformable such that when there is a change in a pressure prevailing in a medium on the second side of the diaphragm, it is possible to measure a change in a voltage, applied via electrical terminals to the diaphragm layer and one of the electrode layer or the doped region, which is required to counteract a deformation of the diaphragm in an electrostatic manner; and contacts connected to the electrical terminals.

2. The pressure sensor as claimed in claim 1, wherein the diaphragm layer has recesses, each of the recesses piercing both first and second sides of the diaphragm layer, wherein a sealing layer is located between the diaphragm layer and the electrode layer, wherein material of the sealing layer applied to the diaphragm layer is introduced into the recesses, and wherein the sealing layer does not cover the second side of the diaphragm layer in an area for the recesses.

3. The pressure sensor as claimed in claim 1, wherein the diaphragm layer is a polysilicon layer.

4. The pressure sensor as claimed in claim 1, wherein the diaphragm layer is a metal layer.

5. The pressure sensor as claimed in claim 1, wherein the electrode layer has at least one metal layer.

\* \* \* \* \*